United States Patent [19]

Levine

[11] Patent Number: 4,471,762
[45] Date of Patent: Sep. 18, 1984

[54] SOLAR HEATING APPARATUS

[75] Inventor: Jerome G. Levine, Harrison, N.Y.

[73] Assignee: Dell Solar Industries, Inc., New Rochelle, N.Y.

[21] Appl. No.: 412,122

[22] Filed: Aug. 27, 1982

[51] Int. Cl.³ ............................................... F24J 3/02
[52] U.S. Cl. .................................... 126/437; 126/432; 126/435
[58] Field of Search ............... 126/437, 432, 421, 422, 126/419, 428, 435, 452; 165/48 S, DIG. 4

[56] References Cited

U.S. PATENT DOCUMENTS

| | | | |
|---|---|---|---|
| 4,019,495 | 4/1977 | Frazier et al. | 126/437 X |
| 4,044,948 | 8/1977 | Bottum et al. | 126/435 X |
| 4,082,143 | 4/1978 | Thomason | 126/435 X |
| 4,119,086 | 10/1978 | Brussels | 126/437 X |
| 4,265,223 | 5/1981 | Miserlis et al. | 126/435 |
| 4,324,228 | 4/1982 | Shippee | 126/435 X |
| 4,326,499 | 4/1982 | Koskela | 126/435 X |

Primary Examiner—Larry Jones
Attorney, Agent, or Firm—Darby & Darby

[57] ABSTRACT

In solar heating apparatus a low-pressure system comprises a solar panel, a reservoir spaced apart from the solar panel, and plumbing connecting the solar panel and the reservoir. The solar panel, reservoir and plumbing form a loop for circulating a first fluid therethrough. The fluid is heated in the reservoir. A high-pressure system comprises a storage tank for storing a second fluid and plumbing for conducting the second fluid into heat-exchange relation to the first fluid as heated, whereby the second fluid is also heated. A pair of pumps is mounted for circulating the first and second fluids within the low-pressure and high-pressure systems, respectively. A motor drives one of the pumps, and a drive shaft connects the pumps, whereby both of the pumps are operated simultaneously by the motor.

15 Claims, 5 Drawing Figures

SOLAR HEATING APPARATUS

BACKGROUND OF THE INVENTION

This invention relates to solar heating apparatus and, more particularly, to novel and highly effective solar heating apparatus which is especially adapted for water heating, which is more reliable than apparatus previously available, and which minimizes the amount of electrical or other energy consumed in comparison to the solar energy collected.

Because of the finite and dwindling supply of fossil fuels which have been man's most important source of energy for heating, transportation, etc., the quest for alternative energy sources has been intensive, especially during recent years. There are serious problems associated with the various actual and theoretical alternatives to fossil fuels. For example, atomic energy is considered by many to be too dangerous; energy from geothermal sources and from wind, waterfalls and tidal movements is reliably and economically available only in certain area; and energy from movements of the earth's crust cannot be harnessed by present technology.

Solar energy is widely recognized as in many ways an ideal substitute for fossil fuels, especially for certain applications such as water heating. It does not pollute the environment; it is continuously renewable; and the energy itself (as opposed to the equipment required to harness it) is free. The problems associated with the harnessing of solar energy are, however, considerable. First, while the total amount of solar energy received by the earth is immense, at any given time it is spread out over half the earth's surface and is everywhere of low intensity compared, for examply, to conditions inside an internal combustion engine, a steam boiler, or an atomic reactor. For this reason, a rather large capital outlay is necessary to harness significant amounts of solar energy. Second, solar energy is available only half the time at any point on the earth's surface, or even less to the extent that clouds, mountains, buildings, etc., block the sun's rays. Third, even when the sun's rays are not totally blocked, they are often considerably attenuated by pollution or, as shortly after sunrise, shortly before sunset, and during winter, by passing through a great thickness of atmosphere.

A copending applicationn of Zebuhr, Ser. No. 248,991, filed Mar. 30, 1981, now abandoned, discloses improved solar heating apparatus particularly adapted for heating water. However, some serious problems associated with the harnessing of solar energy to heat water that have not been fully solved even by the most advanced prior apparatus include water damage to certain parts of the apparatus and shock hazard to personnel in case of a leak and inefficient circulation of the water.

SUMMARY OF THE INVENTION

An object of the invention is to address the problems outlined above associated with the harnessing of solar energy, especially for the purpose of heating water. In particular, an object of the invention is to avoid water damage to sensitive equipment and shock hazard to personnel resulting from water leaks, and to improve circulation efficiency of the water. A correlative object of the invention is to make the inherent drawback of solar energy (sunlight is of relatively low intensity, etc.) less of an obstacle to its efficient and economical exploitation.

The foregoing and other objects are attained in accordance with the invention by the provision of solar heating apparatus combining the following features.

A low-pressure system comprises a solar panel, a reservoir spaced apart from the solar panel, and plumbing connecting the solar panel and the reservoir. The solar panel, reservoir and plumbing form a loop for circulating a first fluid therethrough. The fluid is heated in the solar panel and stored as a heated fluid in the reservoir.

A high-pressure system comprises a storage tank for storing a second fluid and plumbing for conducting the second fluid into heat-exchange relation to the first fluid as heated. In this manner, the second fluid also becomes heated.

A pair of pumps is mounted for circulating the first and second fluids in the low-pressure and high-pressure systems, respectively. Motive means is provided for driving one of the pumps, and mechanical drive means connects the pumps, whereby both of the pumps are operated simultaneously by the motive means.

Apparatus according to the invention is preferably characterized by a number of additional features, including the following.

The pump for circulating the first fluid in the low-pressure system is a submersible pump and is submerged in the first fluid in the reservoir, the pump for circulating the second fluid in the high-pressure system is positioned above the pump for circulating the first fluid, and the motive means is positioned above the pump for circulating the second fluid (and therefore also have the first fluid). Thus, in case of leakage of fluid from the high-pressure pump, the water (the usual fluid employed) tends to drain away from the motive means (usually an electric motor), and damage to the electrical system and electrical shock are less likely than in prior apparatus.

The first fluid, which is circulated through the solar panel, consists essentially of tap water, and the solar panel is elevated with respect to the reservoir, so that when the pumps are not in operation, water in the solar panel drains into the reservoir. The use of ordinary tap water results in a considerable saving, and there need be no concern about freezing of the tap water during, for example, long winter nights, since the water drains safely out of the exposed solar panel and into the reservoir, which can be indoors.

The mechanical drive means comprises a drive shaft, and a rigid tube connects the pumps and surrounds the drive shaft for reducing spurious movements of the drive shaft.

Stationary housing means is provided for each of the pumps. The rigid tube is attached to the respective housing means and is likewise stationary.

The plumbing for conducting the second fluid into heat-exchange relation to the first fluid extends into the reservoir, and heat exchange between the fluids occurs within the reservoir with the fluids in counterflow relation.

The pump mounted for circulating the first fluid in the low-pressure system comprises an impeller formed with a multiplicity of blades mounted for rotation about an axis, each blade forming a dihedral angle such that each blade is substantially convex as viewed from the side thereof towards which it rotates.

The dihedral angle is substantially 30 degrees, and the ratio of (a) the radial dimension measured from the vertex of any of the dihedral angles to the axis, to (b) the radial dimension measured from the radially outer edge of any blade to the axis substantially exceeds 0.5. This ratio is preferably within the range of 0.7 to 0.95 and is ideally substantially 0.85.

BRIEF DESCRIPTION OF THE DRAWING

A better understanding of the invention may be gained from a consideration of the following detailed description of the preferred embodiments thereof in conjunction with the appended figures of the drawing, wherein.

DESCRIPTION OF THE PREFERRED EMBODIMENTS

Figure 1:
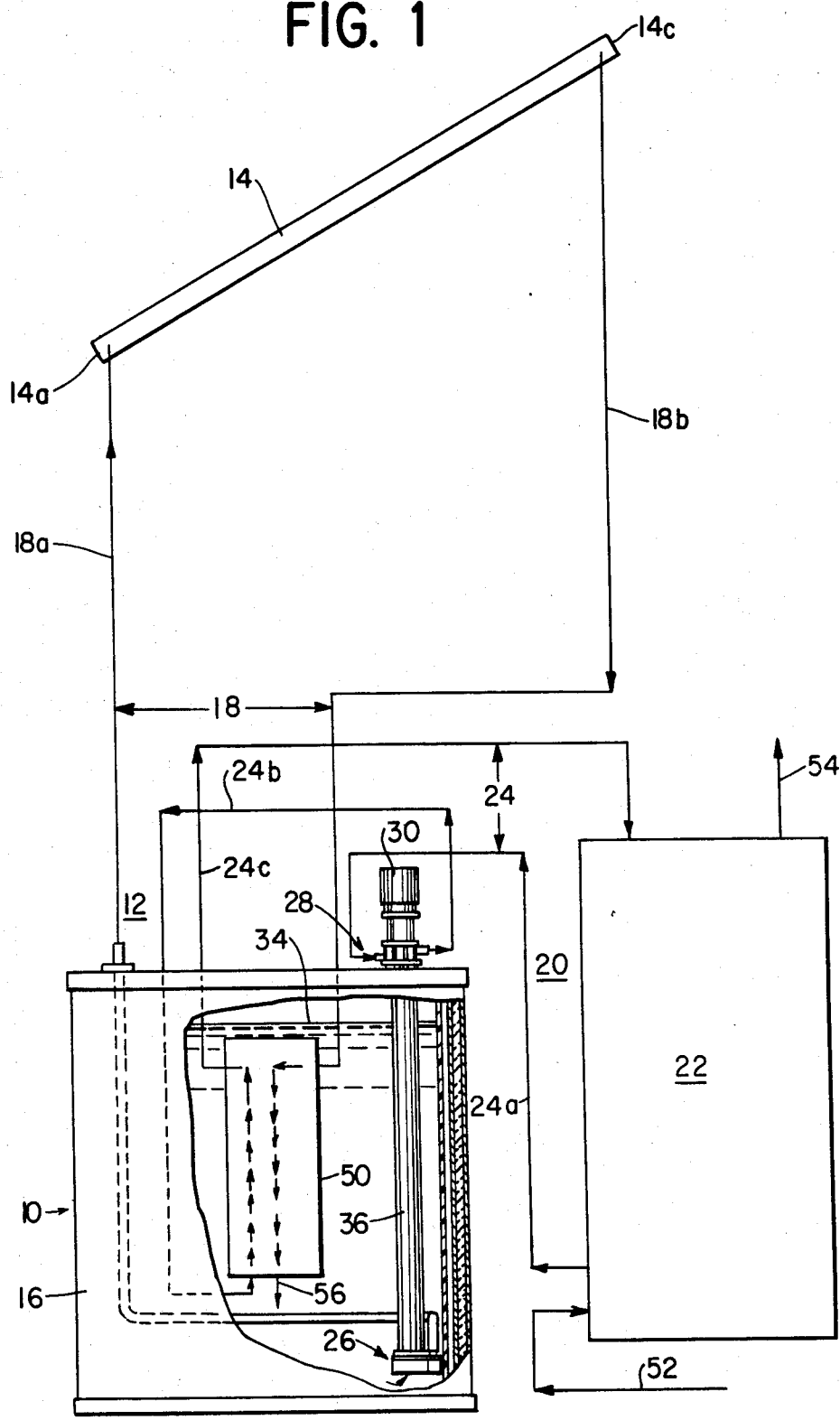
FIG. 1 is a diagrammatic view in elevation of apparatus constructed in accordance with the invention.

FIG. 1 shows solar heating apparatus 10 constructed in accordance with the invention. In this apparatus 10 a low-pressure system 12 comprises a solar panel 14, a reservoir 16 spaced apart from the solar panel 14, and plumbing means 18 connecting the solar panel 14 and the reservoir 16. The solar panel 14, reservoir 16 and plumbing 18 form a loop for circulating a first fluid therethrough. The fluid is heated in the solar panel 14 and stored as a heated fluid in the reservoir.

A high-pressure system 20 comprises a storage tank 22 for storing a second fluid and plumbing means 24 for conducting the second fluid into heat-exchange relation to the first fluid as heated. In this manner, the second fluid also becomes heated.

A pair of pumps 26 and 28 is provided for circulating the first and second fluids in the low-pressure system 12 and the high-pressure system 20, respectively.

Motive means such as an electric motor 30 is provided for driving one of the pumps (preferably the high-pressure pump 28 as illustrated), and mechanical drive means such as a drive shaft 32 (see FIGS. 2A and 2B) connects the two pumps 28 and 26, whereby both of the pumps 28 and 26 are operated simultaneously by the motive means 30.

The pump 26 for circulating the first fluid in the low-pressure system 12 is a submersible pump and is submerged in the first fluid in the reservoir 16, as indicated schematically by the water level 34 (FIG. 1). The pump 28 for circulating the second fluid in the high-pressure system 20 is positioned above the pump 26, and the electric motor 30 is positioned above the pump 28 and above the water level 34. In case of a leak in the high-pressure system 20, particularly in or around the pump 28, the water seeping out will tend to flow away from the electric motor 30, thus minimizing risk of damage to the electrical system and also minimizing the risk of a hazardous electric shock to persons who may come into contact with the apparatus.

The fluid in the low-pressure system 12 is preferably ordinary tap water. Since the solar panel 14 is elevated with respect to the reservoir 16, when the pump 26 is not in operation, water flows down through both branches of the plumbing 18 and into the reservoir 16, until the plumbing 18 is emptied. A conventional vacuum breaker (not shown) is provided anywhere in line 18b to permit this flow.

Figure 2A:
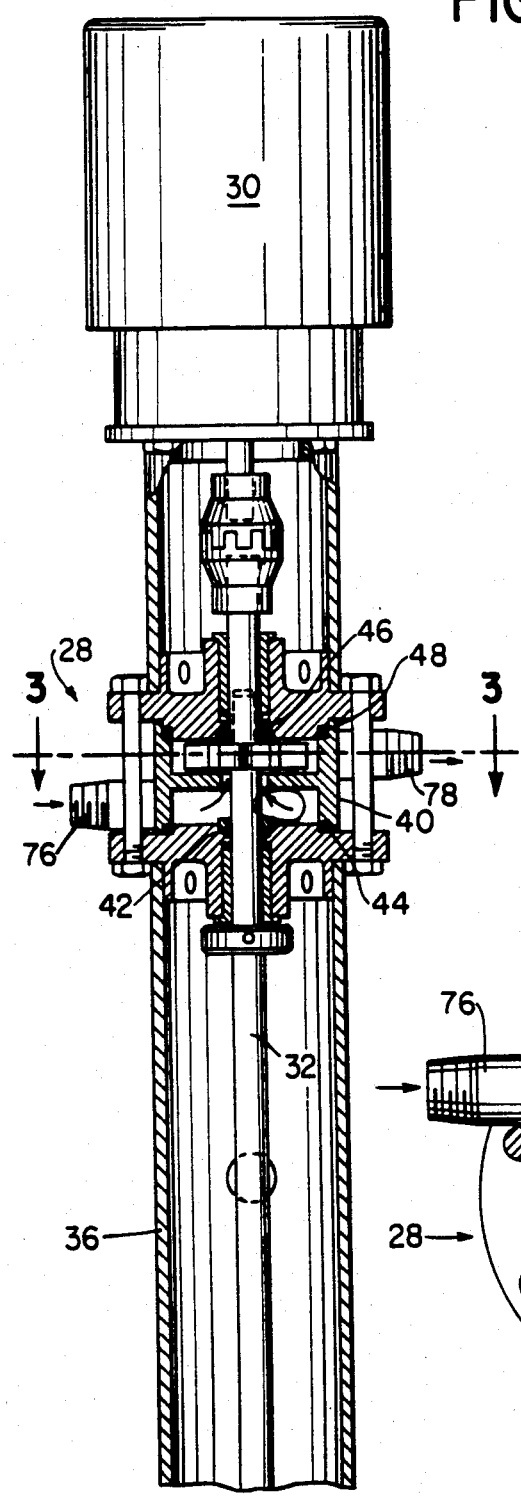
FIGS. 2A and 2B together when arranged with FIG. 2A above FIG. 2B are a view in elevation, partly in axial section, of a portion of the apparatus of FIG. 1.
Figure 2B:
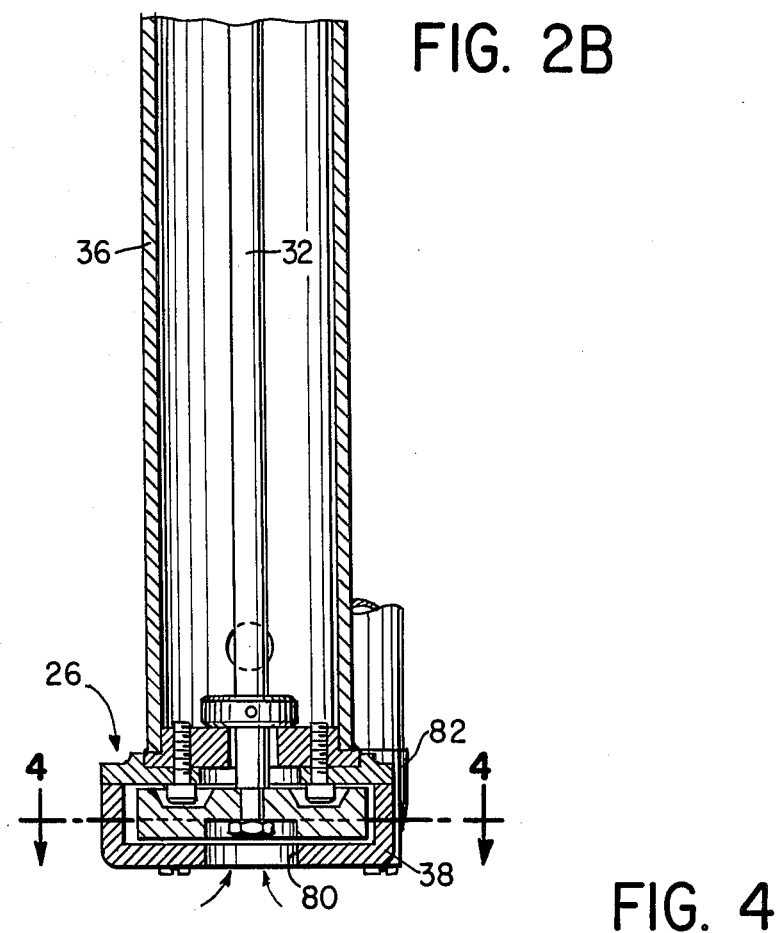

As FIGS. 2A and 2B show, the drive shaft 32, which serves as a mechanical drive means connecting the pumps 28 and 26, is surrounded by a rigid tube 36. The tube 36 connects the pumps 28 and 26 and by rigidifying the entire structure reduces spurious movements of the drive shaft 32.

Figure 3:
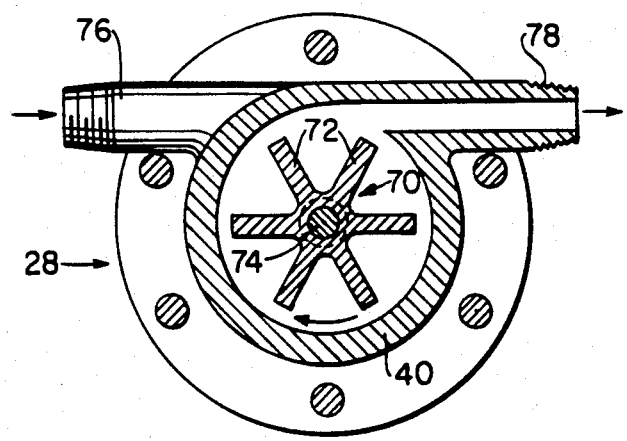
FIG. 3 is a view taken substantially along the line 3—3 of FIG. 2A and looking in the direction of the arrows.
Figure 4:
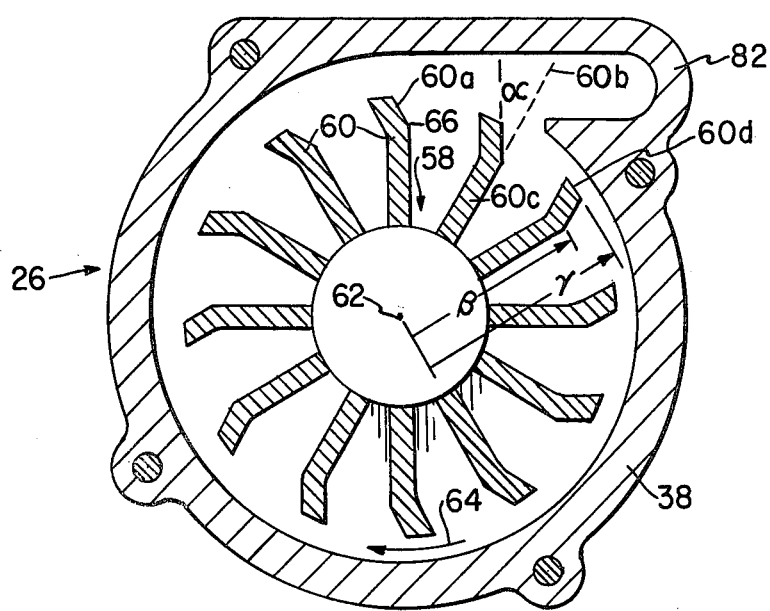
FIG. 4 is a sectional view on an enlarged scale taken substantially along the line 4—4 of FIG. 2B and looking in the direction of the arrows.

A stationary housing 38 comprising a plurality of parts for easy assembly and disassembly is provided for the pump 26, and a stationary housing 40 likewise comprising a plurality of parts is provided for the pump 28, as FIGS. 4 and 3, respectively, show (see also FIGS. 2B and 2A). The tube 36 is attached to the respective housings 38 and 40 and is likewise stationary.

In the case of the high-pressure pump 28, the housing 40 is provided with appropriate O-ring seals 42, 44, 46 and 48 to prevent leakage. Since the pump 26 is submersible and operates under low pressure, leakage is not a problem.

The plumbing 24 for conducting the second fluid into heat-exchange relation to the first fluid extends into the reservoir 16, and heat exchange between the fluids occurs within the reservoir 16. Specifically, the plumbing 24 includes a line 24a extending from the storage tank 22 to the suction side of the pump 28, a line 24b extending from the output side of the pump 28 to a heat exhanger shown schematically at 50 mounted within the reservoir 16, and a line 24c extending from the heat exchanger 50 back to the tank 22. The line 24a withdraws water from the bottom of the tank 22, and the line 24c returns water to the top of the tank 22. Fresh water is supplied to the bottom of the tank 22 by a line 52. The water in the line 52 and therefore the water withdrawn through the line 24a is heated. The heated water returned through the line 24c to the top of the tank 22 is less dense than the unheated water introduced through the line 52 and therefore tends to stay at the top of the tank 22. This stratified heated water is withdrawn through an outlet line 54 to supply hot water for use in the house or other structure in which the apparatus 10 is mounted. Thus, no interior plumbing connections are required within the tank 22.

The heat exchanger 50 is preferably of counterflow construction, as FIG. 1 illustrates schematically. The plumbing 18 includes a line 18a extending from the outlet of the pump 26 to the lower edge 14a of the solar panel 14. When the pump 26 is in operation, water flows upward through the line 18a. The plumbing 18 also includes a descending branch 18b connected to the upper edge 14b of the solar panel 14 and extending from there downward to the heat exchanger 50. When the pump 26 is in operation, water flows upward through the line 18a, upward through the solar panel 14 from the edge 14a to the edge 14b thereof, downward through the line 18b, downward through the heat exchanger 50, and out the bottom of the heat exchanger 50 as indicated by an arrow 56 to be held in the reservoir 16 until returned by the pump 26 to the solar panel 14.

As FIG. 4 best shows, the pump 26 mounted for circulating the first fluid in the low-pressure system 12 comprising an impeller 58 formed with a multiplicity of blades 60 mounted for rotation about an axis 62. Each blade forms a dihedral angle $\alpha$ "alpha" such that each blade is substantially convex as viewed from the side thereof towards which it rotates. The direction of rotation is clockwise as viewed from the top and is shown in FIG. by an arrow 64.

Each dihedral angle $\alpha$ is substantially 30 degrees, as measured from one of the surfaces 60a defining the angle $\alpha$ to an extension 60b of the other surface 60c.

Moreover, the ratio of (a) the radial dimension $\beta$ "beta" measured from the vertex 66 of any of the dihedral angles $\alpha$ to the axis 62 to (b) the radial dimension $\gamma$ "gamma" measured from the radially outer edge 60d of any blade 60 to the axis 62 substantially exceeds 0.5. The ratio of $\beta$ to $\gamma$ is preferably within the range of 0.7 to 0.95 and is ideally substantially 0.85.

This impeller construction has been found to optimize the circulation of fluid through the low-pressure system 12 with a minimum consumption of electrical power. In particular, the new construction makes it possible to pump the water to higher level than would otherwise be possible and facilitates mounting the reservoir 16 in the basement of a house in cases where it would otherwise be necessary to mount the reservoir 16 at a higher level, for example on the first floor, where it would occupy valuable room otherwise available for living space.

The impeller 70 (FIG. 3) for the high-pressure pump 28 is of conventional construction and includes radial blades 72 mounted for rotation about an axis 74. FIGS. 2A and 3 best show the inlet 76 and outlet 78 of the pump 28, and FIG. 2B best shows the inlet 80 and outlet 82 of the pump 26.

In operation, the motor 30 is started whenever there is enough sunlight to produce a useful temperature difference between the low-pressure and high-pressure fluids. If this difference exceeds, say 10° centrigrade, the system is put in operation either manually or automatically, and it continues to run until, because of clouds, darkness, etc., the temperature differential falls to, say 3° centrigrade. At this point, the motor 30 is turned off, again either manually or automatically. Operation of the motor 20 and the pumps 26 and 28 is totally independent of the supply of water through the line 52 to the tank 22 and the withdrawl of water through the line 54 from the tank 22, since water is withdrawn from the tank 22 through the line 24a and returned to the tank 22 through the line 24c at the same rate. The supply of water through the line 52 is automatic in response to withdrawl of water through the line 54.

Since water has a high specific heat, it can be stored for a long period in heated form even though the motor 30 and the pumps 26 and 28 are not running. Preferably, the tank 22 is insulated so that it easily stores hot water through the night, during cloudy days, etc.

Thus, there is provided in accordance with the invention novel and highly effective solar heating apparatus which is especially adapted for water heating, which is more reliable than apparatus previously available, and which minimizes the amount of electrical or other energy consumed in comparison to the solar energy collected. Many modifications of the preferred embodiment of the invention disclosed above will readily occur to those skilled in the art upon consideration of this disclosure. For example, the heat exchanger 50 need not be of counterflow construction. Moreover, the motive means 30 may be an internal combustion engine instead of an electric motor. Accordingly, the invention is to be construed as including all structure which is within the scope of the appended claims.

What is claimed is:

1. In solar heating apparatus the combination of
   a low-pressure system comprising solar panel means, reservoir means spaced apart from said solar panel means, and plumbing means connecting said solar panel means and said reservoir means, said solar panel means, reservoir means and plumbing means forming a loop for circulating a first fluid therethrough, said fluid being heated in said solar panel means and stored as a heated fluid in said reservoir means,
   a high-pressure system comprising storage tank means for storing a second fluid and plumbing means for conducting said second fluid into heat-exchange relation to said first fluid as heated, whereby said second fluid is heated,
   a pair of pumps mounted for circulating said first and second fluids in said low-pressure and high-pressure system, respectively, said pump for circulating said first fluid in said low-pressure system being a submersible pump submerged in said first fluid in said reservoir and said pump for circulating said second fluid in said high-pressure system being positioned in spaced-apart relation to said pump for circulating said first fluid,
   motive means for driving one of said pumps, and
   mechanical drive means connecting said pumps, whereby both of said pumps are operated simultaneously by said motive means.

2. Apparatus according to claim 1 wherein said pump for circulating said second fluid in said high-pressure system is positioned above said pump for circulating said first fluid and said motive means is positioned above said pump for circulating said second fluid and above said first fluid.

3. Apparatus according to claim 1 wherein said first fluid is a liquid.

4. Apparatus according to claim 1 wherein said first fluid consists essentially of tap water.

5. Apparatus according to claim 4 wherein said solar panel means is elevated with respect to said reservoir means so that, when said pumps are not in operation, water in said solar panel means drains into said reservoir means.

6. Apparatus according to claim 1 wherein said mechanical drive means comprises a drive shaft.

7. Apparatus according to claim 6 further comprising rigid tube means connecting said pumps and surrounding said drive shaft for reducing spurious movements of said drive shaft.

8. Apparatus according to claim 7 further comprising stationary housing means for each of said pumps, said rigid tube means being attached to said respective housing means and being likewise stationary.

9. Apparatus according to claim 1 wherein said plumbing means for conducting said second fluid into heat exchange relation said first fluid extends into said reservoir means, and wherein heat exchange between said fluids occurs within said reservoir means.

10. Apparatus according to claim 9 wherein said heat exchange occurs with said fluids in counterflow relation.

11. Apparatus according to claim 1 wherein said pump mounted for circulating said first fluid in said low-pressure system comprises an impeller formed with a multiplicity of blades mounted for rotation about an axis, each blade forming a dihedral angle such that each blade is substantially convex as viewed from the side thereof towards which it rotates.

12. Apparatus according to claim 11 wherein said dihedral angle is substantially 30°, as measured from one of the surfaces defining said angle to an extension of the outer surface.

13. Apparatus according to claim 11 wherein the ratio of (a) the radial dimension measured from the vertex of any of said dihedral angles to said axis to
(b) the radial dimension measured from the radially outer edge of any blade to said axis substantially exceeds 0.5.

14. Apparatus according to claim 13 wherein said ratio is substantially within the range of 0.7 to 0.95.

15. Apparatus according to claim 14 wherein said ratio is substantially 0.85.

* * * * *